(12) United States Patent
Maucher et al.

(10) Patent No.: US 11,975,701 B2
(45) Date of Patent: May 7, 2024

(54) METHOD FOR CHECKING AN ELECTROHYDRAULIC VEHICLE POWER BRAKE SYSTEM OF AN AUTONOMOUSLY DRIVING LAND VEHICLE FOR THE PRESENCE OF AIR IN THE BRAKE FLUID

(71) Applicant: Robert Bosch GmbH, Stuttgart (DE)

(72) Inventors: Thorsten Maucher, Heidelberg (DE); Xun Yao, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 399 days.

(21) Appl. No.: 17/606,951

(22) PCT Filed: Apr. 22, 2020

(86) PCT No.: PCT/EP2020/061124
§ 371 (c)(1),
(2) Date: Oct. 27, 2021

(87) PCT Pub. No.: WO2020/244839
PCT Pub. Date: Dec. 10, 2020

(65) Prior Publication Data
US 2022/0234565 A1    Jul. 28, 2022

(30) Foreign Application Priority Data
Jun. 7, 2019  (DE) .................... 10 2019 208 398.6

(51) Int. Cl.
*B60T 17/22* (2006.01)
*B60T 8/88* (2006.01)
(Continued)

(52) U.S. Cl.
CPC .............. *B60T 17/221* (2013.01); *B60T 8/88* (2013.01); *B60T 13/62* (2013.01); *B60T 13/662* (2013.01);
(Continued)

(58) Field of Classification Search
CPC .......... B60T 17/221; B60T 13/62; B60T 8/88; B60T 2270/413; B60T 2270/402; B60T 2270/406; B60T 13/662
See application file for complete search history.

(56) References Cited

U.S. PATENT DOCUMENTS 8,655,567 B2 * 2/2014 Watanabe ............. B60T 13/686
303/155
9,932,023 B2 * 4/2018 Vollert .................. B60T 11/224
(Continued)

FOREIGN PATENT DOCUMENTS

CN     102695638 A    9/2012
CN     103318166 A    9/2013
(Continued)

OTHER PUBLICATIONS

International Search Report for PCT/EP2020/061124, dated Jul. 28, 2020.

*Primary Examiner* — Pamela Rodriguez
(74) *Attorney, Agent, or Firm* — NORTON ROSE FULBRIGHT US LLP; Gerard A. Messina

(57) ABSTRACT

To check an electrohydraulic power vehicle brake system of a passenger car traveling autonomously on public roads for air in the brake fluid, the method provides for a consecutive generation of a brake pressure using a first power brake-pressure generator and a redundant, second power brake-pressure generator. The brake pressure is intermittently lowered to ambient pressure. In the method, a comparison of the brake fluid volumes required for generating the brake pressure is provided. If the brake fluid volume required for generating the brake pressure using the second power brake-pressure generator is greater, then the presence of air in a brake fluid of the vehicle brake system is inferred.

6 Claims, 1 Drawing Sheet

(51) Int. Cl.
*B60T 13/62* (2006.01)
*B60T 13/66* (2006.01)

(52) U.S. Cl.
CPC ... *B60T 2270/402* (2013.01); *B60T 2270/406* (2013.01); *B60T 2270/413* (2013.01)

(56) References Cited

U.S. PATENT DOCUMENTS

| | | |
|---|---|---|
| 2017/0008502 A1 | 1/2017 | Kanamori et al. |
| 2018/0265068 A1 | 9/2018 | Heil et al. |
| 2021/0316709 A1* | 10/2021 | Thierer .................. B60T 17/22 |

FOREIGN PATENT DOCUMENTS

| | | |
|---|---|---|
| CN | 204077651 U | 1/2015 |
| CN | 105073530 A | 11/2015 |
| DE | 102011077169 A1 | 12/2012 |
| DE | 102014220440 A1 | 7/2015 |
| DE | 112014001744 T5 | 12/2015 |
| DE | 102018205957 A1 | 11/2018 |
| JP | 2008030545 A | 2/2008 |

* cited by examiner

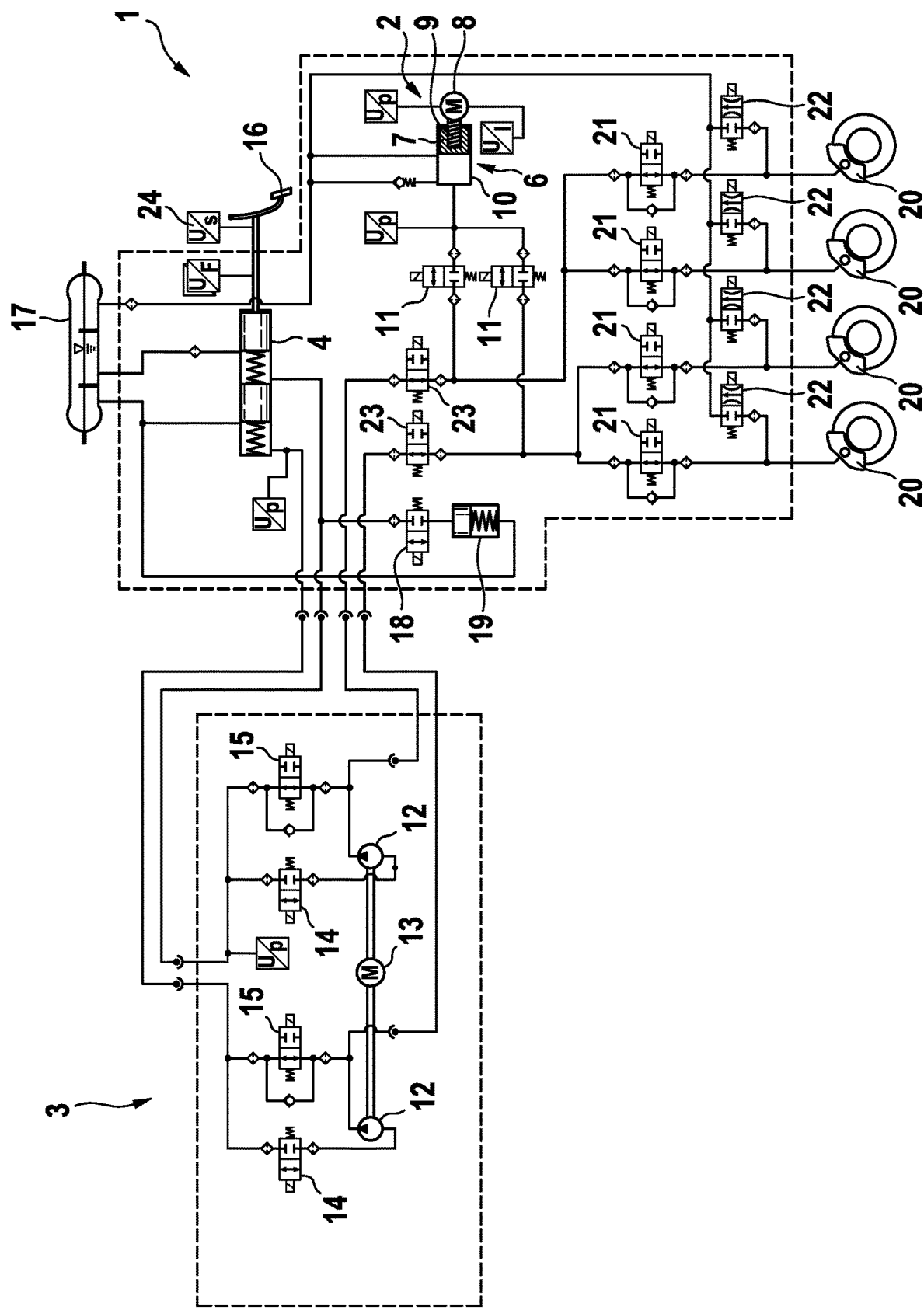

METHOD FOR CHECKING AN ELECTROHYDRAULIC VEHICLE POWER BRAKE SYSTEM OF AN AUTONOMOUSLY DRIVING LAND VEHICLE FOR THE PRESENCE OF AIR IN THE BRAKE FLUID

FIELD

The present method relates to a method for checking an electrohydraulic power brake system of a land vehicle autonomously traveling on public roads for the presence of air in the brake fluid.

BACKGROUND INFORMATION

Autonomous driving up to a level 4 (the driver may be prompted to intervene) and level 5 (the highest level; no driver required) necessitates a power vehicle brake system offering redundancies, which excludes a complete failure of the vehicle brake system with a probability bordering on certainty without the need for a driver intervention.

German Patent Application No. DE 10 2014 220 440 A1 describes an electrohydraulic power brake system for a vehicle equipped with an operating brake unit and an auxiliary brake unit. Both brake units have a power brake-pressure generator with an electrically controllable pressure source and a brake-pressure control valve system for each wheel brake. The auxiliary brake unit is connected to the operating brake unit, and hydraulic wheel brakes are connected to the auxiliary brake unit so that with a passive auxiliary brake unit, the wheel brakes are able to be operated through the auxiliary brake unit by the operating unit, and in an interruption or a malfunction of the operating brake unit, they are operable using the auxiliary brake unit. The individually active brake unit controls the wheel brake pressures in the wheel brakes.

SUMMARY

A check method according to the present invention is provided for an electrohydraulic power brake system of a vehicle for autonomous driving up to levels 4 and 5 on public roads. Level 4 is also known as highly automated driving and means that the control of a vehicle is permanently assumed by an electronic system, and a driver is prompted to intervene only if the system is no longer able to manage the driving tasks. Level 5 is also known as a full automatization and requires no driver.

The vehicle brake system for carrying out the check method according to an example embodiment of the present invention has a first power brake-pressure generator, a second, redundant, power brake-pressure generator, and a manual brake master cylinder, which is also meant to be understood as an auxiliary brake master cylinder in this context, that is to say, as a brake master cylinder having a brake booster. A brake pressure for actuating one or more wheel brake(s) is usually generated by the first power brake-pressure generator. In an interruption or a malfunction of the first power brake-pressure generator, the brake pressure is generated by the second, redundant, power brake-pressure generator. In a non-autonomous driving operation, the brake master cylinder is used as a setpoint device for the brake pressure to be generated by the first power brake-pressure generator. In an interruption or a malfunction of the first power brake-pressure generator during non-autonomous driving, the brake pressure is also able to be generated by the brake master cylinder instead of the second power brake-pressure generator.

The hydraulic wheel brake(s) is/are connected via a first valve to a first power brake-pressure generator and via a second valve to the second, redundant, power brake-pressure generator. In an actuation of the wheel brake(s) by the first power brake-pressure generator, the first valve is open or is opened and the second valve is closed, so that the second power brake-pressure generator is hydraulically separated from the wheel brakes and preferably also separated from the first power brake-pressure generator. In an actuation of the wheel brake(s) by the second power brake-pressure generator, the second valve is open or is opened and the first valve is closed.

As is common in hydraulic vehicle brake systems, the brake master cylinder is connected in particular to a brake fluid reservoir at zero pressure and, via a suction valve and a return valve, to the second, redundant, power brake-pressure generator, which means that if the brake master cylinder is not actuated, the second power brake-pressure generator is able to aspirate brake fluid from the brake fluid reservoir through the brake master cylinder and through the suction valve and/or to return brake fluid from the vehicle brake system through the return valve into the brake master cylinder and, through the brake master cylinder, into the brake fluid reservoir. Via the return valve, the first power brake-pressure generator is likewise able to return brake fluid through the brake master cylinder into the brake fluid reservoir. It is also possible that a shared valve connects the brake master cylinder to the brake fluid reservoir rather than the suction valve and the return valve. If the brake master cylinder is actuated, it hydraulically separates itself, and thus also the second power brake-pressure generator, from the brake fluid reservoir because a brake master cylinder piston has crossed a compensating bore via which the brake master cylinder communicates with the brake fluid reservoir, and closes it as a result, or a central valve in the brake master cylinder piston is closed via which the brake master cylinder communicates with the brake fluid reservoir.

Preferably, the power vehicle brake system has a brake-pressure control valve system with the aid of which the wheel brake pressures in the wheel brake(s) are able to be regulated. A regulation may also refer to a control. The wheel brake pressure is preferably regulated individually in each wheel brake, but it is also possible to regulate wheel brake pressures in groups of wheel brakes or to jointly regulate the wheel brake pressure of all wheel brakes. A magnitude of the wheel brake pressure(s) and thus of brake forces of the wheel brakes is regulated. In addition, a traction-slip control is possible with the aid of the brake-pressure control valve system(s) and one of the two power brake-pressure generators. For instance, such slip-traction controls are anti-lock braking systems, drive-slip control systems and/or a driving dynamics control/electronic stability program, for which the abbreviations ABS, TC/ESP are commonly used. Such drive-slip controls are conventional and will not be described further.

To determine whether air is present in the brake fluid or whether the brake fluid is compressible in general, an example embodiment of the present invention provides a method that has three consecutive phases. Possible additional phases prior to, between or following the phases of the present invention are not excluded. In a first phase, the first valve is opened, the second valve is closed, and a first brake pressure is generated by the first power brake-pressure generator, which is subsequently lowered again, preferably using the first power brake-pressure generator. The first brake pressure is used for operating the wheel brake(s), which means the friction brake pads of the wheel brake(s) are pressed against a brake disk or disks, brake drum or drums, and/or, in general, against a brake element, so that an air gap until the friction brake pads make contact with the brake element(s) is overcome. The first brake pressure is reduced only to such an extent that the friction brake pads continue to rest against the brake element(s) so that no play in the wheel brakes is created that would prevent the determination as to whether air is contained in the brake fluid or, more generally, whether the brake fluid is compressible, or which would at least make such a determination more difficult.

In a second phase of the check method according to an example embodiment of the present invention, the suction valve and the return valve will be or are closed, which means that the brake master cylinder is hydraulically separated, or will be hydraulically separated, from the second power brake-pressure generator, and a second brake pressure is generated by the first power brake-pressure generator. The second brake pressure may have the same magnitude as the first brake pressure or be greater; preferably, the second brake pressure is lower than the first brake pressure. After the second brake pressure has been generated, the first power brake-pressure generator is set to idling again so that it neither increases nor decreases the brake pressure. By opening the return valve, the brake master cylinder is subsequently connected to the first power brake-pressure generator and/or to the second power brake-pressure generator, so that the brake pressure is lowered again. A precondition is that the brake master cylinder is not actuated so that the brake fluid is able to flow through the brake master cylinder into the brake fluid reservoir. At the end of the second phase as well, the brake pressure is lowered only to such an extent that the friction brake pads of the wheel brakes remain in contact with the brake element(s) so that no play is created in the wheel brake(s).

In a third phase of the check method according to an example embodiment of the present invention, the return valve is closed again, the suction valve is opened, and a third brake pressure is generated by the second power brake-pressure generator, which is preferably as high as the second brake pressure, but may also be higher or lower than the first brake pressure or the second brake pressure.

A second brake fluid volume, which is supplied or displaced by the first power brake-pressure generator for the generation of the second brake pressure, is compared with a third brake fluid volume supplied or displaced by the second power brake-pressure generator for the generation of the third brake pressure. The supplied or displaced brake fluid volumes are able to be measured or calculated, for instance based on a piston travel, a piston area and possibly the number of piston travels of the power brake-pressure generators. This does not exclude other possibilities for ascertaining the supplied or displaced brake fluid volumes. In the event that the third brake fluid volume is too large for the generated third brake pressure or, conversely, the third brake pressure is too low for the brake fluid volume supplied or displaced for its generation, then a compressibility of the brake fluid in the region of the second power brake-pressure generator and/or the brake master cylinder has to be assumed.

The method according to the present invention makes it possible to determine whether air is present in the brake fluid in the region of the brake master cylinder and/or the second, redundant, power brake-pressure generator, which will normally not manifest itself when the vehicle brake system is actuated by the first power brake-pressure generator but has an adverse effect on the operation of the vehicle brake system when the power vehicle brake system is to be actuated by the second power brake-pressure generator and/or the brake master cylinder in the event of an error or an interruption of the first power brake-pressure generator.

The method according to the present invention is preferably carried out exclusively when a vehicle equipped with the power vehicle brake system is at a standstill and when the brake master cylinder is not being actuated.

In particular, both power brake-pressure generators are electromechanical brake-pressure generators which have an electric motor which drives a hydraulic pump, especially a piston pump, for the generation of a brake pressure, or which displaces a piston in a cylinder of a piston-cylinder unit.

Advantageous embodiments and further refinements of the present invention are disclosed herein.

All features provided in the description and the figures are able to be realized individually or in basically any combination in exemplary embodiments of the present invention. Embodiments of the present invention that do not have all but only one or more features of embodiments are essentially possible.

BRIEF DESCRIPTION OF THE DRAWING

Below, the present invention will be described in greater detail with the aid of an embodiment illustrated in the figure.

FIG. 1 shows a hydraulic circuit diagram of an electrohydraulic power vehicle brake system, based on which the method according to an example embodiment of the present invention will be described.

DETAILED DESCRIPTION OF EXAMPLE EMBODIMENTS

Electrohydraulic power vehicle brake system 1 shown in FIG. 1 is intended for a land vehicle, i.e., a passenger car, which travels autonomously up to level 4 or 5 on public roads. Level 4 refers to autonomous driving in which the driver may be prompted to intervene, and level 5, the highest level, refers to autonomous driving that does not require any driver intervention. Vehicle brake system 1 is a dual-circuit vehicle brake system.

Power vehicle brake system 1 has a first electromechanical power brake-pressure generator 2, a second, redundant electromechanical power brake-pressure generator 3 and a manual brake master cylinder 4. In the standard case, a brake pressure is generated by the first power brake-pressure generator 2, and when an interruption or a malfunction of first power brake-pressure generator 2 has occurred, the brake pressure is generated by the redundant second power brake-pressure generator 3 and/or brake master cylinder 4. In non-autonomous driving, brake master cylinder 4 is used as a setpoint adjuster for the brake pressure to be generated. In the exemplary embodiment, a pedal travel of brake pedal 16 is measured with the aid of a pedal travel sensor 24.

First power brake-pressure generator 2 has a piston-cylinder unit 6 including a piston 7, which is displaceable in a cylinder 10 of piston-cylinder unit 6 by an electric motor 8 via a mechanical reduction gear unit and a helical gear 9 in order to generate a hydraulic brake pressure. Cylinder 10 is connected to two brake circuits of vehicle brake system 1 via a first valve 11 in each case.

Second power brake-pressure generator 3 has a hydraulic pump 12, e.g., a piston pump, for each brake circuit, which can be jointly driven by an electric motor 13 in order to generate a brake pressure. In each brake circuit, intake sides of hydraulic pumps 12 are connected to brake master cylinder 4 via a suction valve 14, and pressure sides of hydraulic pumps 12 in each brake circuit are connected to brake master cylinder 4 via a return valve 15.

Brake master cylinder 4 is a dual circuit brake master cylinder, which is manually operable using a brake pedal 16. It has a non-pressurized brake fluid reservoir 17 to which brake master cylinder 4 is directly connected, that is to say, especially without an interconnected valve.

In a brake circuit, a piston-cylinder unit having a piston, acted upon by a spring, is connected to brake master cylinder 4 via a simulator valve 18 as a pedal travel simulator 19.

In the exemplary embodiment, vehicle brake system 1 has four hydraulic wheel brakes 20, of which two in each case are assigned to a brake circuit.

Each wheel brake 20 has an intake valve 21 and a discharge valve 22. Via intake valves 21, wheel brakes 20 are connected to first valves 11 of first power brake-pressure generator 2, and they are connected to the pressure sides of hydraulic pumps 12 of second power brake-pressure generator 3 via a second valve 23 in each brake circuit. By way of first valves 11, second valves 23 and return valves 15 of second power brake-pressure generator 3, first power brake-pressure generator 2 is connectable to brake master cylinder 4. Via discharge valves 22, wheel brakes 20 are connected to brake fluid reservoir 17.

Intake valves 21 and discharge valves 22 form wheel brake pressure-control valve systems by which wheel-brake pressures in each wheel brake 20 are able to be individually regulated, a regulation also denoting a control. Slip-traction controls such as an anti-lock braking control, a drive-traction control and a driving dynamics/electronic stability program, for which the abbreviations ABS, ATC and ESP are commonly used, are realizable with the aid of intake valves 21 and discharge valves 22. Such traction controls are conventional and will not be described here.

First valves 11, suction valves 14, return valves 15, simulator valve 18, intake valves 21, discharge valves 22 and second valves 23 are 2/2 way solenoid valves, return valves 15, intake valves 21 and second valves 23 being open in their currentless basic positions and first valves 11, suction valves 14, simulator valve 18 and discharge valves 22 being closed in their currentless basic positions. Other embodiments are possible.

The method according to the present invention for checking power brake system 1 of a vehicle for the presence of air in the brake fluid is preferably carried out exclusively in stationary vehicles and with a non-actuated brake master cylinder 4, so that brake master cylinder 4 communicates with brake fluid reservoir 17. With open first valves 11 and closed second valves 23, a first brake pressure $p_1$ of up to approximately 100 bar, for instance, is then generated by first power brake-pressure generator 2. The brake pressure is generated by displacing piston 7 in cylinder 10 of piston-cylinder unit 6 of first power brake-pressure generator 2 in a first direction without return travel. Because of open intake valves 21, first brake pressure $p_1$ acts on hydraulic wheel brakes 20 so that their brake pads rest against their brake elements such as their brake disks or brake drums. This overcomes an air gap in wheel brakes 20 so that wheel brakes 20 do not take on brake fluid by overcoming the air gap between the brake pads and the brake elements during the further check. Discharge valves 22 of wheel brakes 20 remain closed.

Next, the brake pressure is lowered again by a return travel of piston 7 in cylinder 10 counter to the first direction. In particular, the brake pressure is lowered to the ambient pressure or a slightly higher pressure, which ensures that the brake pads of wheel brakes 20 remain applied to the brake elements.

After the brake pressure has been lowered by the return travel of piston 7 in cylinder 10 of piston-cylinder unit 6 of first power brake-pressure generator 2, first valves 11 remain open and second valves 23 are also opened. Suction valves 14 and return valves 15 of second power brake-pressure generator 3 remain open or are closed so that no brake fluid is able to be displaced into brake master cylinder 4. The renewed displacement of piston 7 in cylinder 10 of piston-cylinder unit 6 of first power brake-pressure generator 2, once again in the first direction, raises the brake pressure again, which means that a second brake pressure $p_2$ is generated. Second brake pressure $p_2$ may have the same magnitude or a higher magnitude than first brake pressure $p_1$, but second brake pressure $p_2$ is preferably lower than first brake pressure $p_1$. In the exemplary embodiment, second brake pressure $p_2$ amounts to approximately 40 bar or, expressed in more general terms, amounts to approximately one-half the first brake pressure $p_1$ or less.

A brake fluid volume $V_2$ required for generating second brake pressure $p_2$ and supplied by first power brake-pressure generator 2 or displaced from cylinder 10 is measured or ascertained. In the exemplary embodiment, second brake fluid volume $V_2$ required for generating second brake pressure $p_2$ is calculated as the product of the travel of piston 7 in cylinder 10 in the first direction, multiplied by a piston surface area.

Then, return valves 15 are opened so that brake fluid flows from cylinder 10 of piston-cylinder unit 6 of first power brake-pressure generator 2 and from wheel brakes 20 into brake master cylinder 4 and through non-actuated brake master cylinder 4 into non-pressurized brake fluid reservoir 17, so that brake pressure p drops to ambient pressure again or to a level slightly above ambient pressure.

After the renewed lowering of brake pressure p, return valves 15 are closed again and suction valves 14 are opened instead. Return valves 15 are closed before the friction brake pads of hydraulic wheel brakes 20 lift off the brake elements. Piston 7 in cylinder 10 of piston-cylinder unit 6 of first power brake-pressure generator 2 is no longer moved until the end of the check method. Using second power brake-pressure generator 3, a third brake pressure $p_3$ is now generated, which is higher, equal to or lower than first brake pressure $p_1$ or second brake pressure $p_2$. In the exemplary embodiment, third brake pressure $p_3$ is approximately as high as second brake pressure $p_2$. Measured or ascertained is a third brake fluid volume $V_3$, which is required for raising the brake pressure to third brake pressure $p_3$ or for generating third brake pressure $p_3$. In the exemplary embodiment, this is accomplished in that the number of revolutions of electric motor 13 of the two hydraulic pumps 12, which are piston pumps in the exemplary embodiment, or the number of piston travels is multiplied by the piston travels, which means the piston travels and the piston surface areas.

Second brake fluid volume $V_2$ is compared with third brake fluid volume $V_3$. If the brake fluid is incompressible, then second brake fluid volume $V_2$ and third brake fluid volume $V_3$ are equal when second brake pressure $p_2$ and third brake pressure $p_3$ are equal and the lowered brake pressures p are equal prior to the generation of second brake pressure $p_2$ by first power brake-pressure generator 2 and prior to the generation of third brake pressure $p_3$ by second power brake-pressure generator 3.

If brake pressures p, $p_2$, $p_3$ differ, then this must be taken into account when comparing brake fluid volumes $V_2$, $V_3$. In practice, small deviations of brake fluid volumes $V_2$, $V_3$ are produced by elasticities of vehicle brake system 1. If third brake fluid volume $V_3$ is considerably greater than second brake fluid volume $V_2$, then air in the brake fluid in the region of second power brake-pressure generator 3 has to be assumed.

If air is present in the brake fluid in the region of first power brake-pressure generator 2 and/or wheel brakes 20, then this increases brake fluid volume $V_2$ required for generating second brake pressure $p_2$ and also third brake fluid volume $V_3$ required for generating third brake pressure $p_3$. A second brake fluid volume $V_2$ increased because of air in the brake fluid, for instance, is determined when second brake pressure $p_2$ is generated by first power brake-pressure generator 2 in that second brake fluid volume $V_2$ required for this purpose and supplied or displaced by first power brake-pressure generator 2 is compared with the generated second brake pressure $p_2$. If generated second brake pressure $p_2$ is too low in comparison with brake fluid volume $V_2$ required for its generation, then the brake fluid is compressible, which means that it contains air or that some other error has occurred in vehicle brake system 1.

A check of a compressibility of the brake fluid in vehicle brake system 1 is carried out, which may lead to the conclusion that air is present in the brake fluid.

What is claimed is:

1. A method for checking an electrohydraulic power vehicle brake system of a land vehicle autonomously traveling on public roads for air in brake fluid, the vehicle brake system including a first power brake-pressure generator configured to generate a brake pressure, to which a hydraulic wheel brake is connected via a first valve, a second, redundant power brake-pressure generator to which the hydraulic wheel brake is connected via a second valve, a manual brake master cylinder, which is connected to a brake fluid reservoir and to which the second power brake-pressure generator is connected via a suction valve and a return valve, the method comprising the following steps:

generating, with the first valve open and the second valve closed, a first brake pressure by the first power brake-pressure generator;

lowering the brake pressure;

with the first valve open, opening the second valve, closing the suction valve and the return valve, and generating a second brake pressure by the first power brake-pressure generator;

opening the return valve so that brake fluid flows through the brake master cylinder into the brake fluid reservoir and the brake pressure is lowered again;

closing the return valve, opening the suction valve, and generating a third brake pressure by the second power brake-pressure generator; and comparing a second brake fluid volume, which is supplied by the first power brake-pressure generator for generating the second brake pressure with a third brake fluid volume, which is supplied by the second brake-pressure generator for generating the third brake pressure.

2. The method as recited in claim 1, wherein the first power brake-pressure generator has a piston-cylinder unit whose piston is moved in a first direction in a cylinder of the piston-cylinder unit to generate the first brake pressure, and which is moved in an opposite direction for a subsequent lowering of the brake pressure and moved anew in the first direction in the cylinder to generate the second brake pressure, and then is no longer moved until the end of the method.

3. The method as recited in claim 1, wherein: (i) the first brake pressure is greater than the second brake pressure, and/or (ii) the third brake pressure and/or the second brake pressure is as high as the third brake pressure.

4. The method as recited in claim 1, wherein the brake pressure during the method is always so high that a friction brake pad of the wheel brake is applied at a brake element.

5. The method as recited in claim 1, wherein the brake master cylinder is connected to the brake fluid reservoir without an interconnected valve.

6. The method as recited in claim 1, wherein the brake fluid reservoir is pressureless.

\* \* \* \* \*